US008312062B1

(12) United States Patent
Spivak et al.

(10) Patent No.: US 8,312,062 B1
(45) Date of Patent: Nov. 13, 2012

(54) AUTOMATIC RESOURCE LEAK DETECTION

(75) Inventors: Victor Spivak, San Mateo, CA (US); Alex Oscherov, Danville, CA (US); David Buccola, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 1557 days.

(21) Appl. No.: 11/393,550

(22) Filed: Mar. 29, 2006

(51) Int. Cl.
*G06F 12/00* (2006.01)
*G06F 17/30* (2006.01)
*G06F 9/44* (2006.01)
*G06F 9/45* (2006.01)

(52) U.S. Cl. ........ 707/814; 707/813; 717/118; 717/130; 717/155; 717/168

(58) Field of Classification Search ........................ None
See application file for complete search history.

(56) References Cited

U.S. PATENT DOCUMENTS

| | | | | |
|---|---|---|---|---|
| 4,961,137 | A * | 10/1990 | Augusteijn et al. | 1/1 |
| 6,675,379 | B1 * | 1/2004 | Kolodner et al. | 717/155 |
| 6,757,708 | B1 * | 6/2004 | Craig et al. | 709/203 |
| 7,472,144 | B2 * | 12/2008 | Ayachitula et al. | 1/1 |
| 2001/0025295 | A1 * | 9/2001 | Kawachiya et al. | 709/106 |
| 2003/0126164 | A1 * | 7/2003 | O'Connor et al. | 707/206 |
| 2004/0098724 | A1 * | 5/2004 | Demsey et al. | 718/104 |
| 2004/0268367 | A1 * | 12/2004 | Roe et al. | 719/318 |
| 2005/0033781 | A1 * | 2/2005 | Dussud | 707/206 |
| 2005/0033945 | A1 * | 2/2005 | Chauvel et al. | 712/226 |
| 2005/0066319 | A1 * | 3/2005 | DeLine et al. | 717/141 |
| 2007/0016633 | A1 * | 1/2007 | Lindholm et al. | 707/206 |

* cited by examiner

*Primary Examiner* — Emerson Puente
*Assistant Examiner* — Jonathan R Labud
(74) *Attorney, Agent, or Firm* — Van Pelt, Yi & James LLP

(57) ABSTRACT

Preventing a resource leak is disclosed. An indication that an implementation object is no longer referenced by a user of the implementation object is received. The implementation object is prevented from becoming unavailable until after it is determined whether a resource associated with the implementation object is released.

21 Claims, 7 Drawing Sheets

AUTOMATIC RESOURCE LEAK DETECTION

BACKGROUND OF THE INVENTION

Resource leaks are created when an application fails to release one or more resources. Resource leaks consume memory and unnecessarily prevent others from using resources that are limited in availability. For example, a UNIX server may only allow a limited number of sessions, so a session resource that never gets released consumes a resource that may be needed by others. Resource leaks can be problematic in Java because an object associated with the resource may no longer be accessible so that even if a leak is detected, it is often not possible to stop the leak. For example, an application may instantiate an object that is associated with a resource. When the application is finished using the resource, if the application fails to release the resource, a garbage collection process will eventually remove the object. However, in some cases the garbage collection process may not be aware of the resource—e.g., if the resource is a non-Java resource and the garbage collection process and object using the resource are associated with the Java Virtual Machine—and therefore does not release the resource. Even if the resource leak is detected, the resource can no longer be released because the only object referencing the resource and/or having a method for releasing the resource has been removed by the garbage collection process. Thus, an improved method of handling resource leaks is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Preventing a resource leak is disclosed. An indication that an implementation object is no longer referenced by a user of the implementation object is received. The implementation object is prevented from becoming unavailable until after it is determined whether a resource associated with the implementation object is released.

Figure 1:
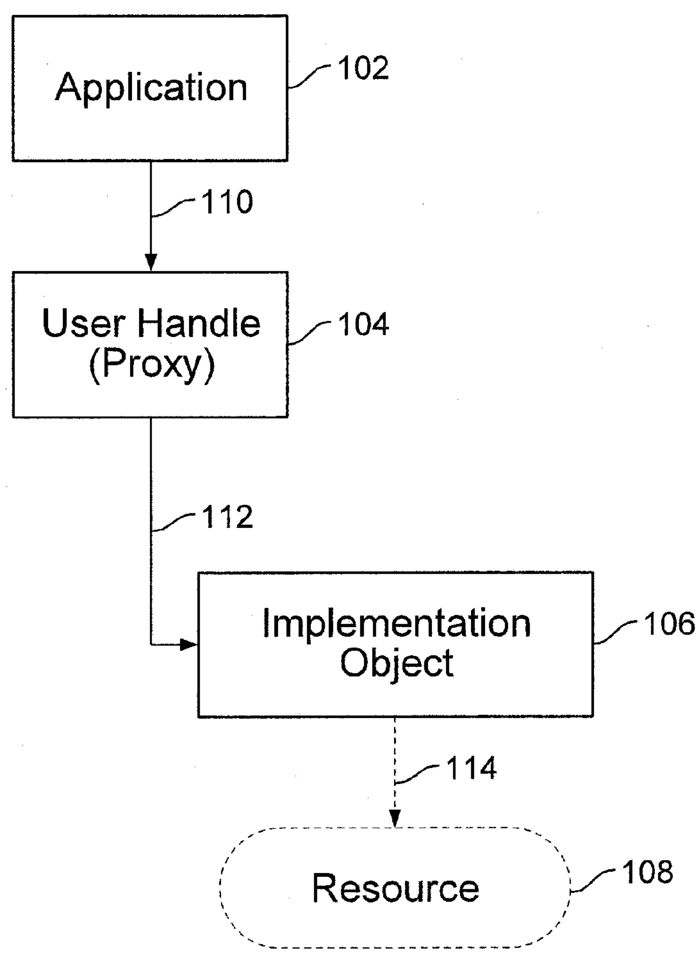
FIG. 1 is a block diagram illustrating an embodiment of a system that may have a resource leak.

FIG. 1 is a block diagram illustrating an embodiment of a system that may have a resource leak. In the example shown, application 102 is using resource 108. In some embodiments, application 102 is a Java 1.2 application and resource 108 is an external resource, where an external resource refers to a resource that is external to Java, sometimes referred to herein as a non-Java resource. Java includes facilities for handling Java (internal) resource leaks through a garbage collection process. The Java garbage collection process removes Java objects that are orphaned or no longer being referenced. However, Java is not capable of handling leaks associated with external, non-Java resources, such as sessions with external applications and/or servers, and will garbage collect a Java object that has not released an associated external resource, e.g., if all references to the Java object have been removed prior to the Java object releasing and/or being instructed to release the resource. An example of a resource leak occurring due to a Java or other software object not releasing an external resource is a "collection" and/or "session" resource associated with a content management system. In the latter context, a collection resource refers to a resource associated with a database cursor (e.g., an external object or process that enables a set of query results and/or individual responsive records to be presented, navigated, accessed, retrieved, etc.) and a session resource refers to a resource associated with a repository connection. For example, application 102 may require access to an external database. To search the database, a database cursor may be used to iterate through a set of data, such as a set of results responsive to a query. To connect to the database, a session resource may be opened.

Although Java 1.2 applications may be used in this and the following examples, in various embodiments, applications may be written in any appropriate language. For example, there may be other languages that interact with resources and/or perform garbage collection in a similar way to Java 1.2. The techniques described herein are applicable whenever a software object or other process or entity associated with, e.g., created and operating primarily in, a first computing environment (e.g., the Java Virtual Machine) interacts with and/or consumes resources not associated or not associated primarily with the first computing environment (e.g., resources associated primarily with a second, different computing environment, such as another environment on the same machine and/or on another machine), and the first environment is configured such that the software object or other process or entity may fail to release the external resource when the resource is no longer required, such as when the software object or other process or entity that consumed the resource itself is no longer required and/or in existence.

In the example shown in FIG. 1, application 102 references user handle 104 using reference 110. User handle 104 references implementation object 106 using reference 112. Implementation object 106 references resource 108 using reference 114, where resource 108 is an external resource, as indicated by the dashed line. User handle 104 is a proxy to implementation object 106 and provides a way for application 102 to interact with implementation object 106. For example, user handle 104 may delegate methods to implementation object 106 and/or expose one or more interfaces of implementation object 106. Because of user handle 104, application 102 does not need to be made aware of changes to implementation object 106. For example, if the location of implementation object 106 changes, reference 112 just needs to be redirected to the new location of implementation object 106.

In an example, application 102 may open a session between a user and a content server. To open a session, a "connect," "open," or "reserve" method may be called, e.g., by application 102. Such methods may be associated with an implementation object and specific to the implementation object and/or resource type. In response, user handle 104, implementation object 106, and references 110 and 112 are created, if not created previously. Reference 114 to the managed content server session resource (resource 108) is created. In some embodiments, the session 108 is established by the implementation object 106 in response to the call from application 102 to a method of implementation object 106 that either exists to enable such a session to be established and/or requires that such a session be established to be able to perform a called method, e.g., to retrieve from the content server a content item associated with implementation object 106. The application may then access the content server via user handle 104. User handle 104 delegates methods to implementation object 106, which can access resource 108 as appropriate. In some embodiments, application 102 is not aware of a proxy between application 102 and implementation object 106. Application 102 interacts with user handle 104 as if it is interacting directly with implementation object 106.

When access to the content server is no longer needed, if properly configured application 102 will indicate that resource 108 should be released (or is no longer needed). For example, a "disconnect," "close," or "release" method of the implementation object will be called to release the resource. In response to such an indication, resource 108 is released and reference 114 is removed. User handle 104, implementation object 106, reference 110, and/or reference 112 may also be removed, e.g., if no longer needed. In some embodiments, references 110 and 112 are removed, and user handle 104 and implementation object 106 are left for a garbage collection process to remove.

In the event that the application fails to release resource 108, when reference 110 is removed, user handle 104, reference 112, and implementation object 106 may be removed by a garbage collection process. In an embodiment in which user handle 104 and implementation object 106 comprise Java objects running in the Java virtual machine (JVM), the JVM garbage collection process would not be aware of reference 114 and that resource 108 had not been released. In this example, even if the resource leak is detected, there are no objects that reference resource 108 so that it can be released. Thus, resource 108 remains allocated, a condition sometimes referred to as a resource leak.

In some embodiments, user handle 104 is not used. For example, application 102 may directly reference implementation object 106 using reference 110. In the event that application 102 does not release resource 108, when reference 110 is removed, implementation object 106 is removed by a garbage collection process since it is no longer being referenced and a resource leak is created.

Figure 2:
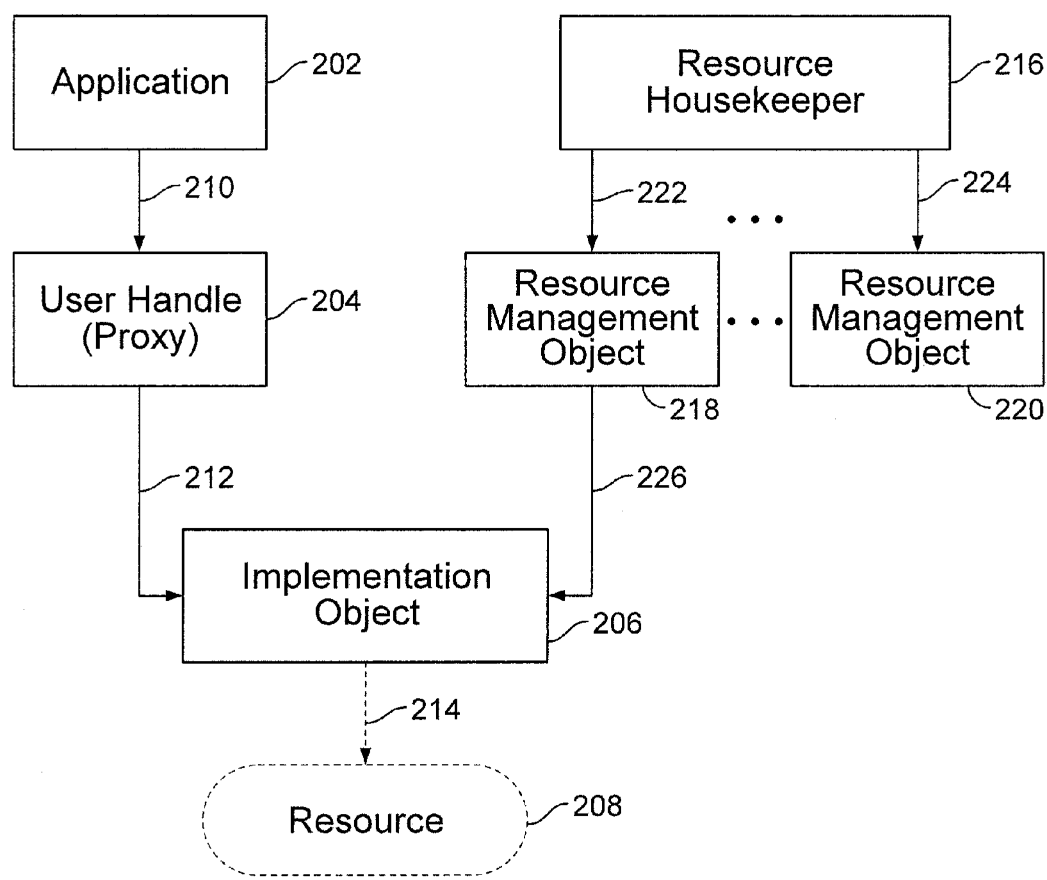
FIG. 2 is a block diagram illustrating an embodiment of a system for managing resource leaks.

FIG. 2 is a block diagram illustrating an embodiment of a system for managing resource leaks. In the example shown, application 202 references user handle 204 using reference 210. User handle 204 references implementation object 206 using reference 212. Implementation object 206 references resource 208 using reference 214, where resource 208 is an external resource, as indicated by the dashed line. User handle 204 is a proxy to implementation object 206. Resource management object 218 references implementation object 206 using reference 226.

In some embodiments, multiple resource management objects 218-220 are managed by resource housekeeper 216 using references 222-224. In the example shown, each resource management object 218-220 is associated with one implementation object. In some alternative embodiments, a resource management object may reference more than one implementation object. In some embodiments, a resource management object is different for different types of implementation objects and/or resources. For example, a resource management object for a session resource may be different from that for a collection resource. In some embodiments, an implementation object may have more than one resource management object referencing it at any one time, e.g., one resource management object for each resource or type of resource associated with the implementation object. In the example shown in FIG. 2, resource housekeeper 216 and resource management object 218 manage resource 208. In some embodiments, there is no resource housekeeper 216, and resource management object 218 is capable of performing one or more of the functions of resource housekeeper 216, as more fully described below. In some embodiments, more than one resource housekeeper is associated with a resource management object.

For example, application 202 may open a session between a user and a content server. To open a session, a "connect," "open," or "reserve" method may be called. In response, user handle 204, implementation object 206, references 210 and 212, resource management object 218, and reference 226 are created. Reference 214 to the session resource (resource 208) is also created. The application may then access the content server via user handle 204. User handle 204 delegates methods to implementation object 206, which can access resource 208 as appropriate. When access to the content server is no longer needed, if properly configured application 202 would indicate that resource 108 should be released (or is no longer needed). For example, a "disconnect," "close," or "release" method may be called. In response, resource 208 is released and reference 214 is removed. Once the implementation object itself is no longer needed by application 202, in the example shown it would remove reference 210, which through normal garbage collection would result in user handle 204, implementation object 206, and reference 212 being removed. As described more fully below, in some embodiments, upon learning that reference 210 and/or reference 212 has/have been removed, implementation object 206 is queried to determine whether resource 208 has been released. If not, implementation object 206 is used to release resource 208. Once confirmation is received that the resource has been released, in some embodiments reference 222 is removed, resulting in resource management object 218 and implementation object 206 being removed by the normal garbage collection process.

In the event that the application does not release resource 208, when reference 210 is removed, user handle 204 and reference 212 may be removed by a garbage collection process. The Java virtual machine garbage collection process does not in this case remove implementation object 206 because reference 226 to implementation object 206 still exists and remains available to be used to release resource 208, if necessary.

In some embodiments, user handle 204 is not used. For example, application 202 may directly reference implementation object 206 using reference 210. In such embodiments, in the event that application 202 does not release resource 208, when reference 210 is removed, implementation object 206 is not removed by a garbage collection process since resource management object 218 still references it.

In some embodiments, as more fully described below, implementation object 206 implements content management functionality available through a platform on which application 202 is running, for example, by providing access to a body of managed content, the ability to store different versions of content, and/or the ability to search for content. Resource 208 may include a collection resource, such as a database cursor, or a session resource, such as a repository connection.

In some embodiments, resource 208 includes a process, a TCP/IP or other network connection, or a disk file. In the case of a process, the process may include an operating system process or a process that results from running native code. An example of a disk file resource is a temporary file, which should be released when it is no longer needed.

Figure 3:
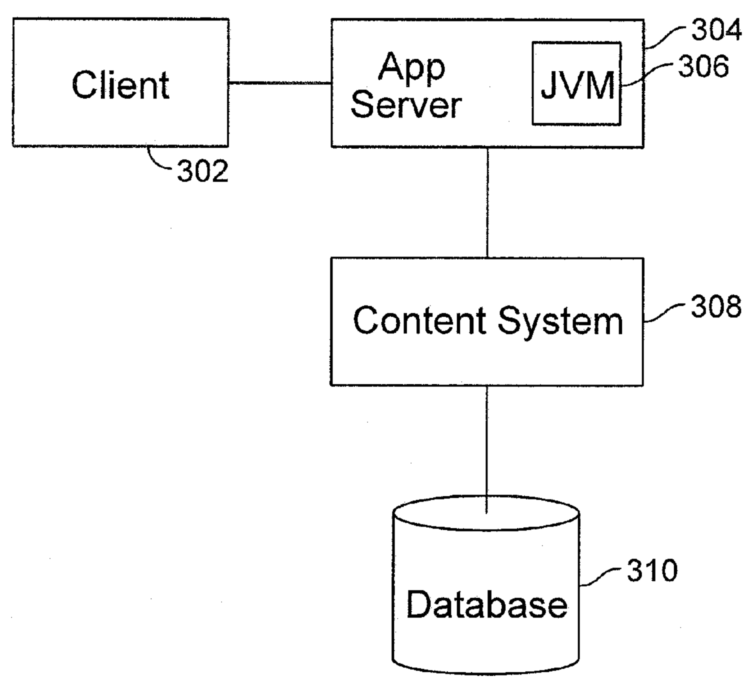
FIG. 3 is a block diagram illustrating an embodiment of a system in which an application may run.

FIG. 3 is a block diagram illustrating an embodiment of a system in which an application, such as application 202, may run. In the example shown, client 302 interacts with application server 304 to access content in a content management system. For example, client 302 may communicate with application server 304 via an Internet connection. Application server 304 includes Java virtual machine (JVM) environment 306. Java objects, such as user handle 204 and implementation object 206, and internal resources reside in JVM environment 306. External resources such as resource 208 reside outside JVM environment 306. For example, an external resource may include a TCP/IP connection between application server 304 and content system 308, or a session between content system 308 and database 310. There may be a limited number of TCP/IP connections and/or sessions that are available.

Application server 304 interacts with content system 308 to access managed content, store different versions of content, and/or search for content. The content may reside in database 310. There may be more than one application server interacting with content system 308, which may further limit resource availability.

Figure 4:
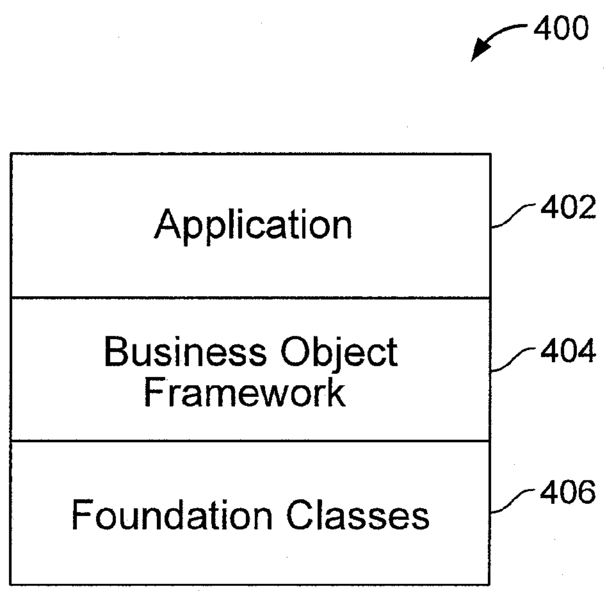
FIG. 4 is a block diagram illustrating an embodiment of an application server.

FIG. 4 is a block diagram illustrating an embodiment of an application server, such as application server 304. In the example shown, application server 400 is shown to include application 402, business object framework 404, and foundation classes 406. Application 402 uses an application program interface (API) to make calls to business object framework 404. Business object framework 404 implements content management functionality, which is built on top of foundation classes 406. Foundation classes 406 may include Java classes.

Application 402 can cause objects to be created. For example, application 402 can invoke logic in business object framework 404 to cause implementation objects to be instantiated to implement content management functionality. For example, in response to a database query, an implementation object and a collection resource may be created.

Figure 5:
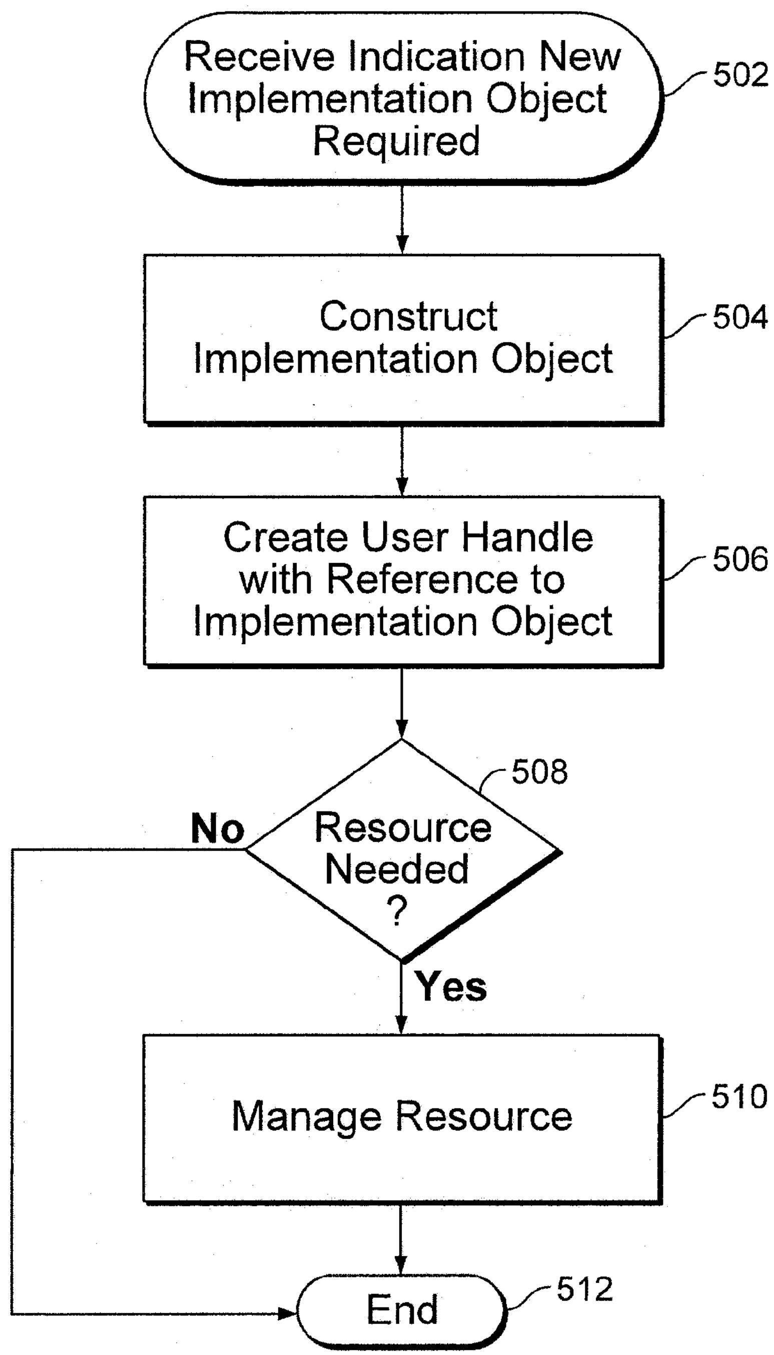
FIG. 5 is a flowchart illustrating an embodiment of a process for processing an indication that a new implementation object is required.

FIG. 5 is a flowchart illustrating an embodiment of a process for processing an indication that a new implementation object is required. In some embodiments, this process is implemented on an application server such as application server 304. In the example shown, an indication that a new implementation object is required is received at 502. The indication may comprise an explicit or implicit request for a resource. An explicit request includes a direct request for a resource, such as a request to open a session. An implicit request includes an indirect request for a resource, such as a search query, which causes a collection resource request to be made. In some embodiments, a request is made by invoking logic in business object framework 404. For example, a "connect," "open," or "reserve" method may be called. At 504, an implementation object is constructed. The implementation object is associated with the requested resource and is capable of performing functions to interact with the resource. In some embodiments, a reference to the implementation object is returned to the application. In some embodiments, a user handle to the implementation object is constructed at 506 and returned to the application. For example, referring to FIG. 2, implementation object 206 is created and user handle 204 is returned to application 202. At 508, it is determined whether a resource is needed. For example, the implementation object required at 502 is not necessarily associated with a resource, so a resource may not be needed. If a resource is needed, the resource is managed at 510. For example, one or more resource management entities including object(s) and/or reference(s) may be created to ensure that the resource does not leak. In some embodiments, the resource management entities prevent the implementation object from becoming unavailable until after it is determined whether a resource associated with the implementation object is released. Examples of this are provided below. If a resource is not needed, the process ends at 512.

In some embodiments, if the implementation object is an internal resource, then the resource is not managed. If the implementation object is an external resource, then the resource is managed at 510.

Figure 6:
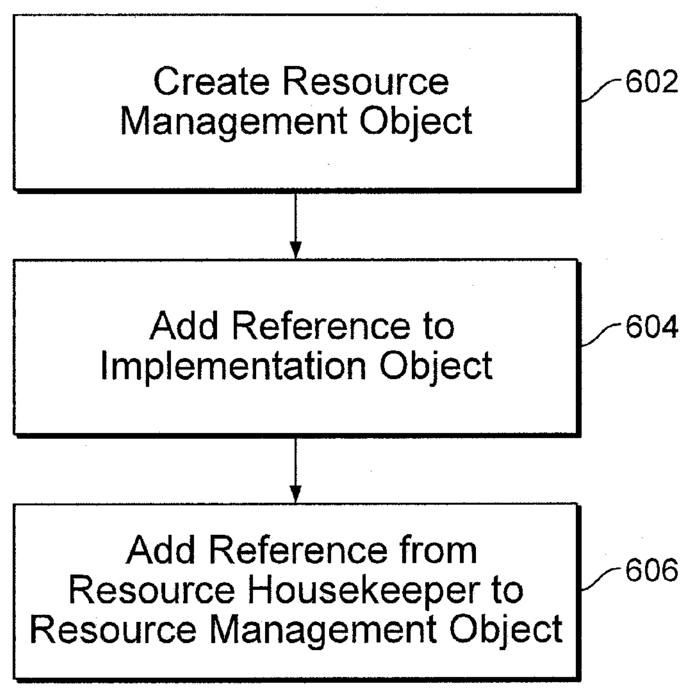
FIG. 6 is a flowchart illustrating an embodiment of a process for managing a resource.

FIG. 6 is a flowchart illustrating an embodiment of a process for managing a resource. This process may be implemented on an application server such as application server 304. In some embodiments, this process may be used to manage a resource, such as at 510. In the example shown, a resource management object is created at 602. For example, referring to FIG. 2, if implementation object 206 is created, resource management object 218 is created to manage implementation object 206. In some embodiments, a resource management object is different for different types of implementation objects. In such embodiments, a resource management object appropriate for the implementation object is created. At 604, a reference to an implementation object is added. For example, reference 226 from resource management object 218 to implementation object 206 is created. At 606, a reference from a resource housekeeper to the resource management object is added. For example, reference 222 from resource housekeeper 216 to resource management object 218 is added. 606 is optional. In some embodiments, a resource housekeeper is not used and 606 is not needed.

In some embodiments, an appropriate object (such as user handle 204 or implementation object 106) is placed in a reference queue so that an indication that a reference to the object is removed can be received, as more fully described below. In various embodiments, the order of the steps of the above process may vary. For example, 606 may occur before 604.

Figure 7:
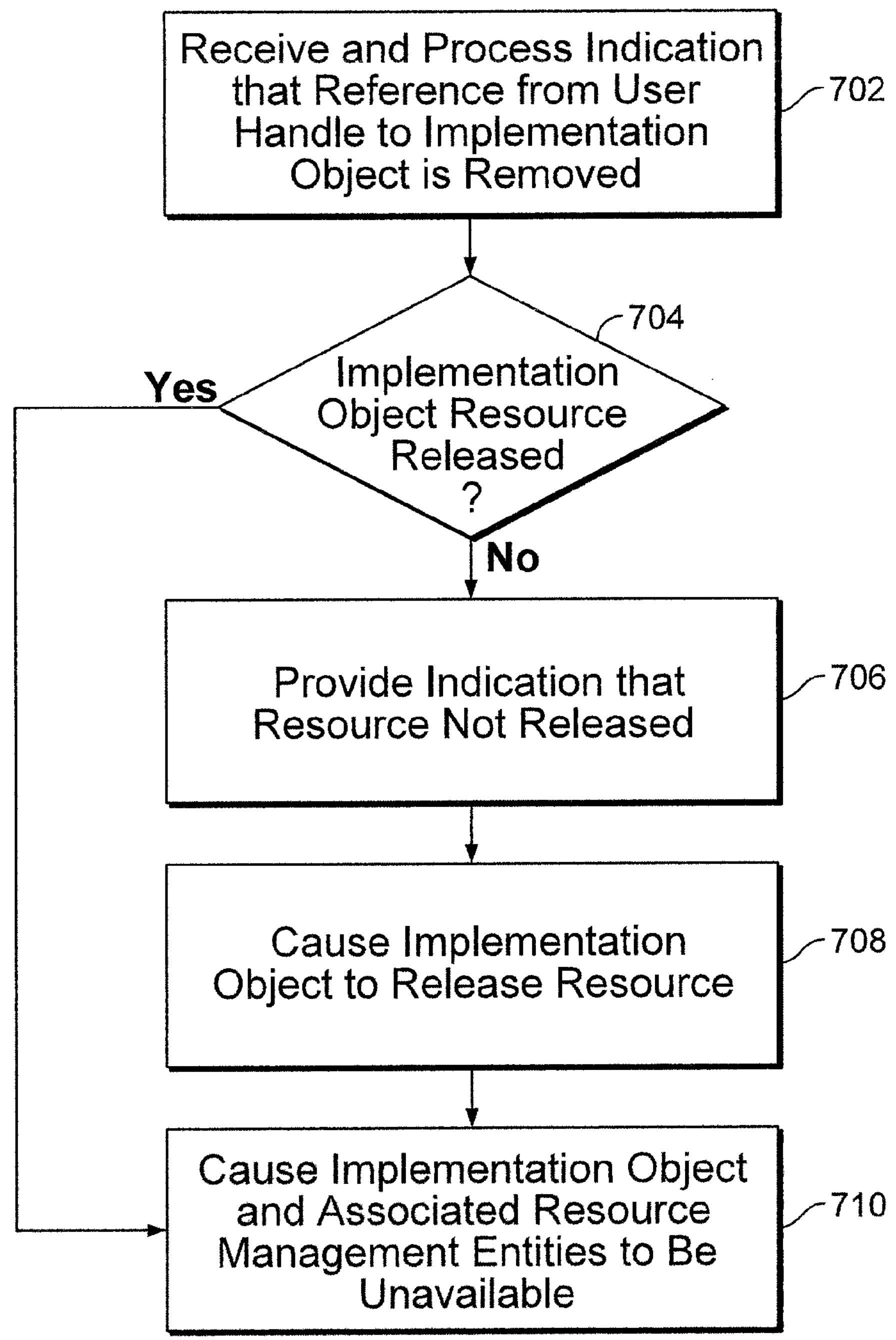
FIG. 7 is a flowchart illustrating an embodiment of a process for processing an indication that a reference from a user handle to an implementation object is removed.

FIG. 7 is a flowchart illustrating an embodiment of a process for processing an indication that a reference from a user handle to an implementation object is removed. This process may be implemented on an application server, such as application server 304. In the example shown, an indication that a reference from a user handle to an implementation object is removed is received and processed at 702. The indication may be received as a result of a reference queue mechanism that notifies the resource housekeeper or appropriate resource management object when the reference is removed. For example, the resource housekeeper or resource management object may listen to a reference queue for such an indication.

For example, referring to FIG. 2, an indication that reference 212 is removed is received. Reference 212 may be removed as a result of application 202 removing its reference 210, resulting in user handle 204 and its associated reference 212 to implementation object 206 being removed as a result of a garbage collection process.

In the event that application 202 fails to release resource 208 prior to reference 210 being removed, user handle 204 and reference 212 may be removed by a garbage collection process. In various embodiments, 702 may comprise receiving one or more of the following: an indication to release a resource from an application or an indication that a resource is no longer needed (e.g., by calling a "disconnect," "close," or "release" method), an indication that a reference to a user handle is removed, an indication that a user handle is removed, and an indication that a reference to an implementation object is removed. In some embodiments, the indication may be received and processed by a resource housekeeper. In some embodiments, the indication may be received and processed by a resource management object associated with the implementation object, such as resource management object 218.

At 704, it is determined whether a resource associated with the implementation object is released. In some embodiments, a resource housekeeper uses a resource management object associated with the implementation object to determine whether the resource is released. The resource management object in turn uses the implementation object to determine whether the resource is released and to release the resource, if necessary. In some embodiments, a resource management object receives the indication at 702, and the resource management object queries the implementation object to determine whether a resource associated with the implementation object is released. For example, resource management object 218 receives the indication at 702, and queries implementation object 206 to determine whether resource 208 is released.

If the resource is released, then at 710, the implementation object and associated resource management entities are caused to be unavailable. In some embodiments, 710 comprises causing the implementation object and associated resource management entities to be removed or deleted. For example, in FIG. 2, if resource 208 is released, then resource housekeeper 216 removes reference 222, which results in resource management object 218, reference 226, and implementation object 206 being removed, e.g., by operation of the normal garbage collection process (because resource management object 218 would no longer have any reference to it). In embodiments without a resource housekeeper, resource management object 218, reference 226, and/or implementation object 206 are removed.

If the resource is not released, then at 706, an indication that the resource is not released is provided. For example, an alert or warning message may be generated and printed in a log file or output to a command prompt, which can be read by a user. This enables the user to fix the resource leak, such as by ensuring the application that caused the implementation object to be instantiated and use the resource is configured to ensure the resource has been released, such as by calling a method of the implementation object, prior to removing the application's reference to the implementation object and/or an associated user handle.

At 708, the implementation object is caused to release the resource. In some embodiments, a resource management object associated with the implementation object invokes a method of the implementation object which causes the implementation object to release the resource. In embodiments with a resource housekeeper, the resource housekeeper finds the resource management object that references the implementation object, and tells the resource management object to cause the implementation object to release the resource. The resource housekeeper then waits to receive an indication that the resource is released. In some embodiments, the resource housekeeper directs the resource management object to release the resource, which in turn directs the implementation object to release the resource. At 710, the implementation object and associated resource management entities are caused to be unavailable, as described above.

In some embodiments, a resource management object associated with the implementation object performs the process of FIG. 7. In some embodiments, a resource housekeeper performs 702, 706, and 710 and a resource management object associated with the implementation object performs 704 and 708. For example, in some embodiments the resource housekeeper causes the implementation object to perform 704 and 708 by making an appropriate method call.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of preventing a resource leak, including:

creating a resource management object having a reference to an implementation object;

receiving, at a processor, an indication that the implementation object is no longer referenced by an entity other than the resource management object;

in response to receiving the indication that the implementation object is no longer referenced by the entity, using the processor to determine whether a resource accessible via the implementation object is released; and in the event it is determined that the resource is not released, preventing the implementation object from becoming unavailable, at least temporarily, including by preventing a garbage collection process from consuming the implementation object by retaining, at least while the resource is not released, one or both of the resource management object and the reference from the resource management object to the implementation object wherein the existence of one or both of the resource management object and the reference from the resource management object to the implementation object prevents the garbage collection process from consuming the implementation object.

2. A method as recited in claim 1, wherein receiving the indication includes one or more of the following: receiving an indication that an application is no longer referencing a user handle that references the implementation object or receiving an indication that a reference associated with the implementation object has been removed from a reference queue.

3. A method as recited in claim 1, further including in the event it is determined that the resource is not released, providing an indication that the resource is not released.

4. A method as recited in claim 1, further including in the event it is determined that the resource is not released, generating a warning message.

5. A method as recited in claim 1, wherein determining includes using the resource management object to determine whether the resource is released and the resource management object in turn uses the implementation object to determine whether the resource is released.

6. A method as recited in claim 1 further comprising in the event it is determined that the resource is not released:

using the resource management object to cause the implementation object to release the resource; and after using the resource management object to cause the implementation object to release the resource, permitting the garbage collection process to remove the implementation object including by removing at least the reference from the resource management object to the implementation object.

7. A method as recited in claim 6, wherein:

the resource management object, the implementation object, and the garbage collection process are associated with a first computing environment;

the resource is associated with a second computing environment, wherein the garbage collection process, running in the first computing environment, cannot release the resource; and using the resource management object to cause the implementation object to release the resource includes: using a process, associated with the second computing environment and provided by the implementation object, to release the resource.

8. A method as recited in claim 1 further comprising: in the event it is determined that the resource is released, removing a reference to the resource management object whereby the garbage collection process is permitted to consume the implementation object.

9. A method as recited in claim 8, wherein removing a reference to the resource management object causes the garbage collection process to consume the resource management object and the implementation object.

10. A system for preventing a resource leak, including:

a processor configured to:

create a resource management object having a reference to an implementation object;

receive an indication that the implementation object is no longer referenced by an entity other than the resource management object;

in response to receiving the indication that the implementation object is no longer referenced by the entity, determine whether a resource accessible via the implementation object is released; and in the event it is determined that the resource is not released, prevent the implementation object from becoming unavailable, at least temporarily, including by preventing a garbage collection process from consuming the implementation object by retaining, at least while the resource is not released, one or both of the resource management object and the reference from the resource management object to the implementation object wherein the existence of one or both of the resource management object and the reference from the resource management object to the implementation object prevents the garbage collection process from consuming the implementation object; and a memory coupled with the processor, wherein the memory provides the processor with instructions.

11. A system as recited in claim 10, wherein determining includes using the resource management object to determine whether the resource is released and the resource management object in turn uses the implementation object to determine whether the resource is released.

12. A system as recited in claim 10, wherein the processor is further configured to in the event it is determined that the resource is not released:

use the resource management object to cause the implementation object to release the resource; and after using the resource management object to cause the implementation object to release the resource, permit the garbage collection process to remove the implementation object including by removing at least the reference from the resource management object to the implementation object.

13. A system as recited in claim 12, wherein:

the resource management object, the implementation object, and the garbage collection process are associated with a first computing environment;

the resource is associated with a second computing environment, wherein the garbage collection process, running in the first computing environment, cannot release the resource; and the processor is configured to use the resource management object to cause the implementation object to release the resource, including by: using a process, associated with the second computing environment and provided by the implementation object, to release the resource.

14. A system as recited in claim 10, wherein the processor is further configured to: in the event it is determined that the resource is released, removing a reference to the resource management object whereby the garbage collection process is permitted to consume the implementation object.

15. A system as recited in claim 14, wherein removing a reference to the resource management object causes the garbage collection process to consume the resource management object and the implementation object.

16. A computer program product for preventing a resource leak, the computer program product being embodied in a non-transitory computer readable storage medium and comprising computer instructions for:

creating a resource management object having a reference to an implementation object;

receiving an indication that the implementation object is no longer referenced by an entity other than the resource management object;

in response to receiving the indication that the implementation object is no longer referenced by the entity, determining whether a resource accessible via the implementation object is released; and in the event it is determined that the resource is not released, preventing the implementation object from becoming unavailable, at least temporarily, including by preventing a garbage collection process from consuming the implementation object by retaining, at least while the resource is not released, one or both of the resource management object and the reference from the resource management object to the implementation object wherein the existence of one or both of the resource management object and the reference from the resource management object to the implementation object prevents the garbage collection process from consuming the implementation object.

17. A computer program product as recited in claim 16, wherein determining includes using the resource management object to determine whether the resource is released and the resource management object in turn uses the implementation object to determine whether the resource is released.

18. A computer program product as recited in claim 16 further comprising in the event it is determined that the resource is not released computer instructions for:

using the resource management object to cause the implementation object to release the resource; and after using the resource management object to cause the implementation object to release the resource, permitting the garbage collection process to remove the implementation object including by removing at least the reference from the resource management object to the implementation object.

19. A computer program product as recited in claim 18, wherein:

the resource management object, the implementation object, and the garbage collection process are associated with a first computing environment;

the resource is associated with a second computing environment, wherein the garbage collection process, running in the first computing environment, cannot release the resource; and the computer instructions for using the resource management object to cause the implementation object to release the resource include computer instructions for: using a process, associated with the second computing environment and provided by the implementation object, to release the resource.

20. A computer program product as recited in claim 16 further comprising computer instructions for: in the event it is determined that the resource is released, removing a reference to the resource management object whereby the garbage collection process is permitted to consume the implementation object.

21. A computer program product as recited in claim 20, wherein removing a reference to the resource management object causes the garbage collection process to consume the resource management object and the implementation object.

* * * * *